United States Patent [19]
Nakamura

[11] Patent Number: 5,758,296
[45] Date of Patent: May 26, 1998

[54] MOBILE TELEPHONE RECEIVER WITH ADAPTIVELY INSERTED IF FILTERS AND AN IF FILTER INSERTING METHOD

[75] Inventor: Taisuke Nakamura, Tokyo, Japan

[73] Assignee: NEC Corporation, Tokyo, Japan

[21] Appl. No.: 563,650

[22] Filed: Nov. 28, 1995

[30] Foreign Application Priority Data

Nov. 28, 1994 [JP] Japan .................. 6-316076

[51] Int. Cl.$^6$ .................................................. H04B 1/06
[52] U.S. Cl. .................. 455/575; 455/266; 455/340; 455/307; 375/284
[58] Field of Search .................. 455/266, 180.1, 455/188.1, 191.1, 89, 338, 339, 340, 307, 575; 375/284, 285, 346, 351, 226, 224, 227

[56] References Cited

U.S. PATENT DOCUMENTS

| | | | |
|---|---|---|---|
| 4,792,993 | 12/1988 | Ma | 455/266 |
| 4,972,455 | 11/1990 | Phillips et al. | 455/76 |
| 5,287,556 | 2/1994 | Cahill | 455/307 |
| 5,303,413 | 4/1994 | Braegas | 455/266 |
| 5,339,455 | 8/1994 | Vogt et al. | 455/266 |
| 5,499,394 | 3/1996 | Kaatz et al. | 455/266 |
| 5,564,093 | 10/1996 | Matsumoto | 455/307 |
| 5,584,056 | 12/1996 | Kim | 455/266 |

FOREIGN PATENT DOCUMENTS 0 400 983  5/1990  European Pat. Off. .

OTHER PUBLICATIONS

European Search Report, dated May 30, 1997.

Primary Examiner—Andrew I. Faile
Assistant Examiner—Aung S. Moe
Attorney, Agent, or Firm—Whitham, Curtis & Whitham

[57] ABSTRACT

A mobile telephone receiver, utilized in a cellular communications system, is provided with a group of IF bandpass filters which are arranged in parallel and which respectively have different passbands with each other. The IF filter group allows an incoming IF signal to be filtered out using one of the IF bandpass filters. A signal contamination determiner is operatively coupled to the IF filter group and determines a degree of signal contamination by examining a signal which has passed through the IF bandpass filter selected for filtering the incoming IF signal. The selector changes the selection of the IF bandpass filters according to the degree of signal contamination.

12 Claims, 5 Drawing Sheets

MOBILE TELEPHONE RECEIVER WITH ADAPTIVELY INSERTED IF FILTERS AND AN IF FILTER INSERTING METHOD

BACKGROUND OF THE INTION

1. Field of the Invention

The present invention relates generally to a mobile telephone receiver and more specifically to such a receiver having a plurality of IF (intermediate frequency) bandpass filters one of which is adaptively inserted in a signal path in accordance with receive signal quality. The present invention is applicable to either of analog or digital type mobile radio communications systems.

2. Description of the Related Art

It is known in the art to apply frequency reuse in a mobile radio communications system in order to satisfy various objectives such as large subscribers capacity, efficient spectrum use, adaptability to traffic density, etc. The frequency reuse refers to the use of channels on the same carrier frequency to cover different areas which are separated from one another by sufficient distances so that cochannel interference is not objectionable. A system utilizing such concept is known as a cellular mobile radio system.

The most serious effect of the mobile environment on cellular system performance is the creation of fuzzy cell boundaries. The signal contour is actually only a convenient idealization of what turns out to be a very messy reality. The fuzziness of cell boundaries is caused by topographical factors which vary with different cells and also by constantly changing transmission characteristics.

Adjacent channel interference occurs when signal energy from one channel spills over into an adjacent channel or when a filter on the receiver is too "loose" and captures energy front a broader band than it really needs to. Adjacent channel interference can be eliminated if receiver filtering is considerably tighter. However, the tighter the filter requirements, the more expensive the implementation, and as such, it is a common practice that adjacent channels are not used within the same cell because of loose receiver filtering.

However, as mentioned above, it is practically impossible to exactly define or estimate the actual cell boundaries. Therefore, it is a current practice to narrow or tighten the passband of an IF bandpass, provided in a receiver, so as to obviate adjacent channel interference. This prior approach, however, is objectionable in terms of high fidelity of reproduced voice. Further, even if a traffic density is lowered to such an extent that the adjacent channel interference rarely occurs during midnight (for example), the narrow IF bandpass filter remains utilized under such a condition.

What is desired is therefore to adaptively select one of a plurality of IF bandpass filters depending on actual mobile environments.

SUMMARY OF THE INVENTION

It is an object of the present invention to provide a mobile radio telephone receiver which is equipped with a plurality of IF filters one of which is adaptively inserted into a signal path depending on measured receive signal quality.

Another object of the present invention is to provide a method of adaptively inserting one of a plurality of IF filters in a signal path depending on measured receive signal quality.

These objects are fulfilled by a mobile telephone receiver, utilized in a cellular communications systean, which is provided with a group of IF bandpass filters which are arranged in parallel and which respectively have different passbands with each other. The IF filter group allows an incoming IF signal to be filtered out using one of the IF bandpass filters. An IF filter selector is operatively coupled to the IF filter group and determines a degree of signal contamination by examining a signal which has passed through the IF bandpass filter selected for filtering the incoming IF signal. The selector changes the selection of the IF bandpass filters according to the degree of signal contamination.

More specifically, a first aspect of the present invention resides in a mobile telephone receiver used in a cellular communications system, comprising: a group of IF (intermediate frequency) bandpass filters which are arranged in parallel and which have respectively different passbands with each other, said group allowing an incoming IF signal to be filtered out using one of said IF bandpass filters; and asignal contamination determiner determining a degree of signal contamination by examining a signal which has passed through said one of said IF bandpass filters, said determiner changing selection of said IF bandpass filters according to said degree of signal contamination.

A second aspect of the present invention resides in a method of adaptively controlling IF signal filtering at a mobile telephone receiver used in a cellular communications system, said method comprising the steps of: (a) allowing an incoming IF signal to be filtered out using one of a plurality of IF bandpass filters which are arranged in parallel and which have respectively different passbands with each other; (b) determining a degree of signal contamination by examining a signal which has passed through said one of said IF bandpass filters; and (c) changing selection of said IF bandpass filters according to said degree of signal contamination.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention is discussed with reference to FIGS. 1–8.

The present invention resides in provision of a plurality of IF bandpass filters one of which is adaptively inserted in a receive signal path in accordance with a degree of measured receive signal contamination.

Figure 1:
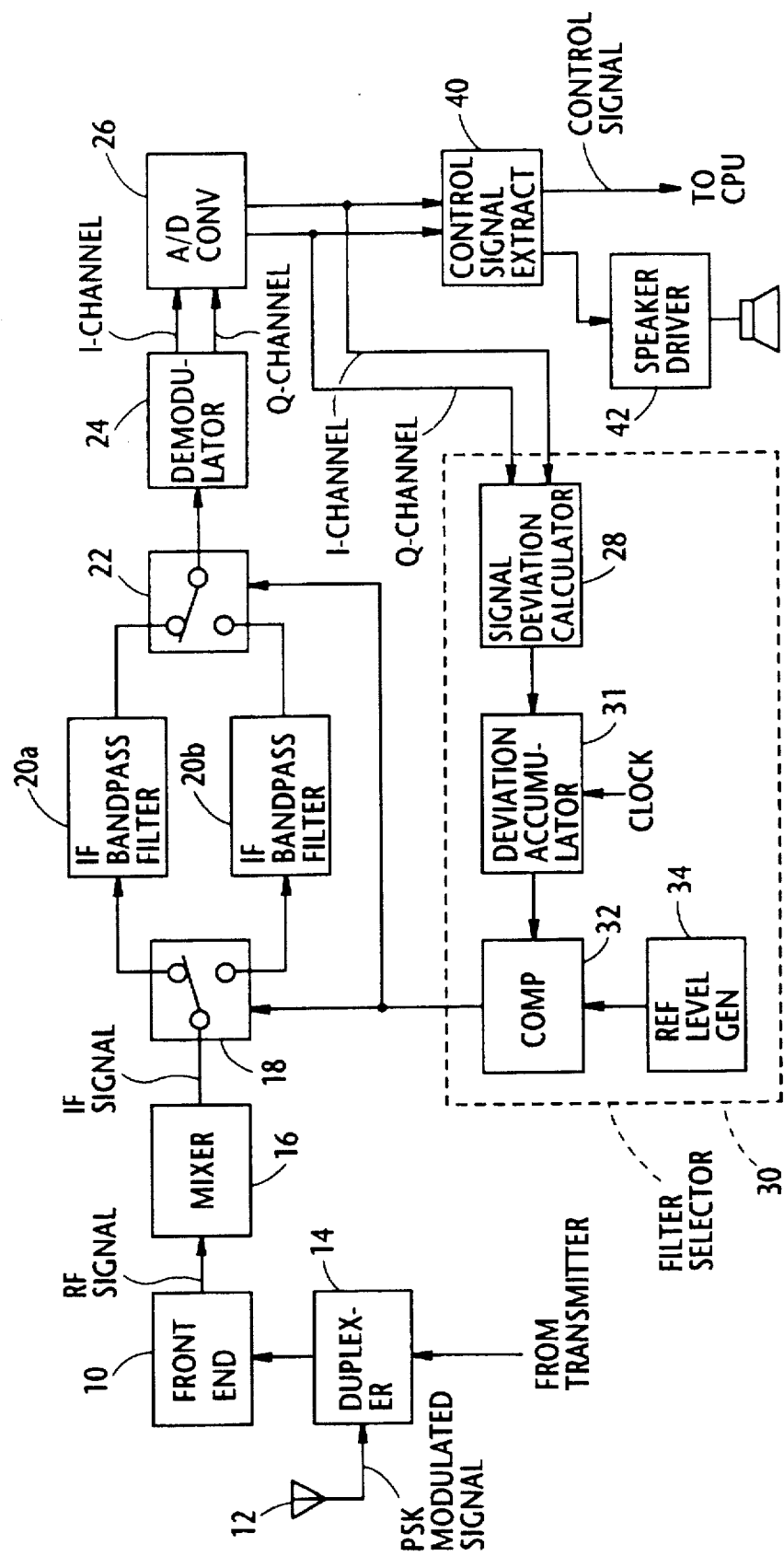
FIG. 1 is a block diagram showing a preferred embodiment of the present invention.

Referring to FIG. 1, there is shown part of a mobile radio telephone receiver in block diagram form. As shown, a QPSK (quaternary phase shift keying) modulated signal is applied to a front end 10 by way of an antenna 12 and a duplexer 14. A signal to be transmitted is applied to the duplexer 14 from a transmitter (not shown) which is irrelevant to the present invention. An RF (radio frequency) signal, which is picked up by the front end 10, is amplified and applied to a mixer 16 which converts the RF signal to an IF signal. A local oscillator coupled to (or included in) the mixer 16 is not shown in FIG. 1 in that the operation of the mixer per se is well known in the art. The IF signal is then applied to an IF bandpass filter 20a via a switch 18 in the illustrated case.

Figure 2:
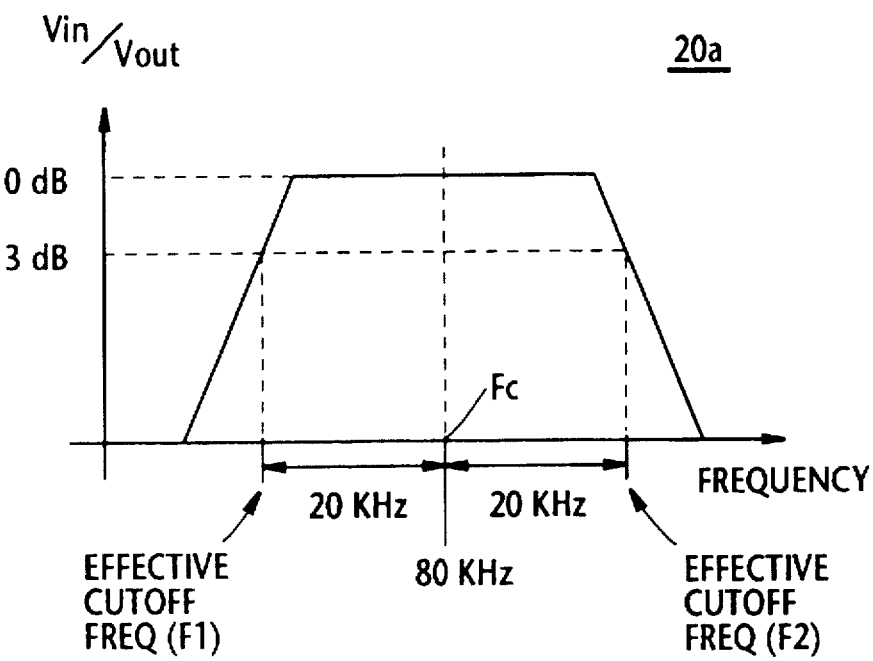
FIG. 2 is a diagram schematically showing a passband of a filter of FIG. 1.
Figure 3:
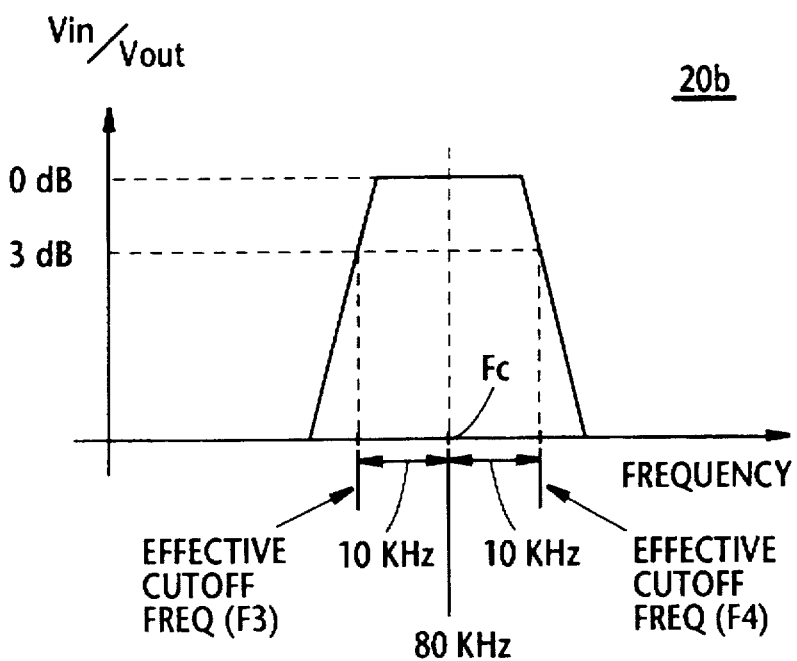
FIG. 3 is a diagram schematically showing a passband of another filter of FIG. 1.

The passband of filters 20a and 20b are schematically shown in FIGS. 2 and 3, respectively. As shown in FIGS. 2 and 3, the IF bandpass filter 20a has an effective passband of 40 KHz (=20 KHz+20 KHz), while the IF filter bandpass 20b has an effective passband of 20 KHz (=10 KHz+10 KHz). It is assumed that a center frequency Fc of each of the filters 20a and 20b is 80 MHz merely by way of example.

The output of the filter 20a is applied, via a switch 22, to a demodulator 24 which takes the form of coherent QPSK demodulator in this particular case. As is known in the art, according to coherent detection which is used to demodulate a received M-ary PSK modulated signal, the received signal is mixed with a locally reproduced carrier to produce I- and Q-channel signals (viz., baseband signal). For further details of M-ary PSK demodulator, reference should be made to U.S. Pat. No. 5,157,604 granted to Iwasaki, et al. and assigned to the same entity of the present application. The I- and Q-channel signals undergo analog-to-digital (A/D) conversion at a functional block 26.

Figure 4:
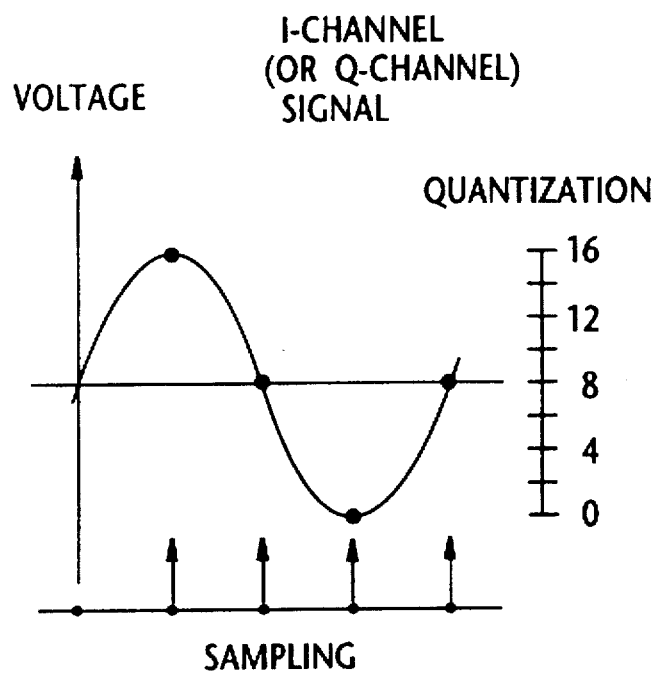
FIG. 4 is a sketch schematically showing a waveform of an I-channel (or Q-channel) signal appearing in the arrangement of FIG. 1.
Figure 5:
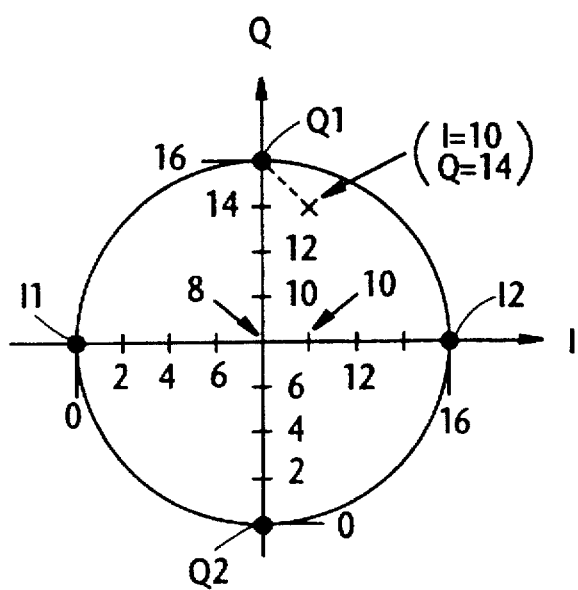
FIG. 5 is a phase diagram for explaining a signal deviation from a normal signal level according to the embodiment of the present invention.
Figure 6:
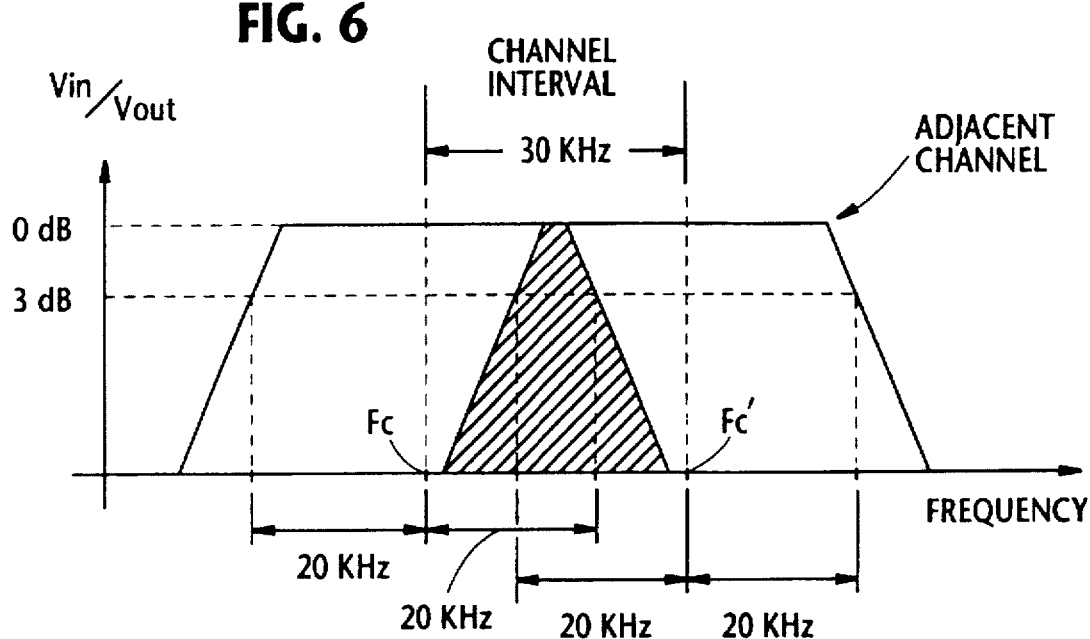
FIGS. 6–8 are sketches each for describing the operation of the embodiment of the present invention.
Figure 7:
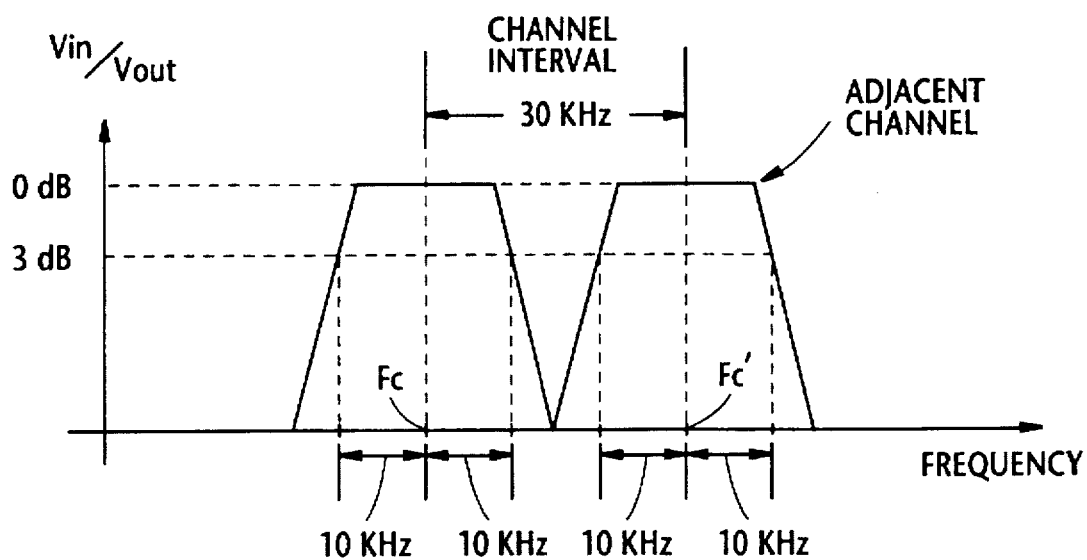
Figure 8:
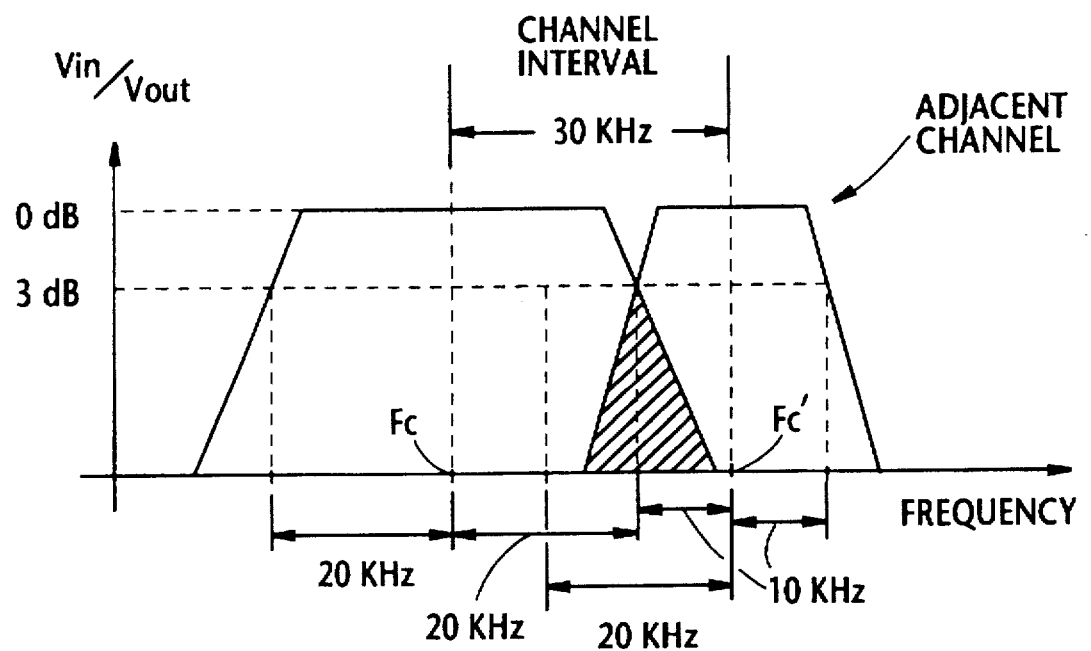

FIG. 4 is a sketch for the sake of a better understanding of sampling and quantization of the I-channel (or Q-channel) signal applied to the A/D converter 26. The sampled levels are quantized by 16 (viz., 4 bits) levels in the present embodiment. The A/D onversion is notorious to one skilled in the art and ence a further description is deemed redundant and ccordingly omitted for brevity. The I- and Q-channal signals, which have been digitized at the A/D converter 26, are fed to a signal deviation calculator 28 which forms part of a filter selector 30. The operation of the signal deviation calculator 28 is briefly discussed with reference to a phase diagram shown in FIG. 5. Four black circles (depicted by Q1, Q2, I1 and I2) on I and Q axes indicate normal (reference) signal points. If the coordinates of a received signal point (depicted by "x" in FIG. 5) applied from the A/D converter 26 is (I=10, Q=14), it is readily understood that a deviation of the receive signal point x from the normal point Q1 can be calculated. A plurality of deviations, each of which is calculated as mentioned above, are successively added in a suitable memory (not shown) in a deviation accumulator 31 at a predetermined time interval (10 ms merely by way of example). When the predetermined time period elapses, the accumulator 31 applies the sum of the deviations to a comparator 32 to which a threshold is also applied from a reference level generator 34. When the comparator 32 detects that the sum of the deviation crosses the threshold, it applies a filter change signal to the switches 18 and 22. It is to be noted that the threshold level may be empirically determined through field work investigation.

The operation of the present embodiment is further described.

When the telephone receiver of FIG. 1 is initially powered, the comparator 32 applies a logic 1 (for example) to the switches 18 and 22 so as to originally select the IF filter 20a whose passband is broader than that of the IF filter 20b. If an adjacent channel is not utilized in either of the neighboring cells, no adjacent channel interference occurs.

On the contrary, it is assumed, when the receiver of FIG. 1 is initially powered, that a given receiver located in an adjacent cell has already used an IF bandpass filter which is a counterpart of the filter 20a. In such a case, there exists the high probability that the adjacent channel interference is induced as understood from FIG. 6. Thus, the deviation accumulator 31 outputs a value which exceeds the threshold level produced from the reference level generator 34. The comparator 32 responds to issue a logic 0 which renders the switches 18 and 22 to select the filter 20b. Following this, the above mentioned given receiver within the adjacent cell is also forced to use a narrower IF bandpass filter which corresponds to the filter 20b. It is to be noted that the above mentioned order of changing to the narrow bandpass filters at the two receivers is reversed depending on the operating conditions of the two receivers. If the two receivers located in the respective adjacent cells begin to use the narrower IF bandpass filters, no adjacent channel interference occurs as understood from FIG. 7.

On the other hand, it is assumed, when the receiver of FIG. 1 is initially powered, that a given receiver located in an adjacent cell has already used a narrow IF bandpass filter which is a counterpart of the filter 20b. In such a case, there also exists the probability that the adjacent channel interference occurs as understood from FIG. 8. Thus, the deviation accumulator 31 outputs a value which exceeds the threshold level produced from the reference level generator 34. The comparator 32 responds to such a situation and issues a logic 0 which renders the switches 18 and 22 to select the filter 20b. Since the receiver of FIG. 1 begins to use the narrow IF bandpass filter 20b, adjacent channel interference can effectively be avoided.

The outputs of the A/D converter 26 are also applied to a control signal extractor 40 from which a control signal(s) is extracted and applied to a controller such as a CPU (central processing unit) for supervising an overall operation of the receiver of FIG. 1. An audio signal from the control signal extractor 40 is applied to a speaker via a driver 42. These blocks are not concerned with the present invention.

It will be understood that the above disclosure is representative of only one possible embodiment of the present invention and that the concept on which the invention is based is not specifically limited thereto.

For example, the receiver of FIG. 1 can readily be modified such as to include more than two IF filters. With this modification, the comparator 32 has to be modified to issue three different switch control signals and, the reference level generator 30 is modified so as to produce two different thresholds.

Further, the present invention is in no way limited to the QPSK modulated signal but is applicable to m-ary (m=8, 16, 32, . . .) PSK system. Still further, the present invention is able to use various signals modulated using various techniques such as FSK (frequency shift keying), etc.

What is claimed is:

1. A mobile telephone receiver used in a cellular communications system, comprising;

a group of IF (intermediate frequency) bandpass filters which are arranged in parallel and which have respectivelty different passbands with each other, said group allowing an incoming LF signal to be filtered out using one of said IF bandpass filters; and a signal contamination determiner for deterimining a degree of signal contamination by examining a signal which has passed through said one of said IF bandpass filters, said determiner adaptively changing selection of said IF bandpass filters according to said degree of signal contamination, wherein said signal contamination determiner includes:

a calculator for receiving a baseband signal outputted from a demodulator and calculating a receive signal deviation from a normal signal point, said calculator successively producing a plurality of receive signal deviations, an accumulator coupled to receive and accumulate said plurality of receive signal deviations at a predetermined time interval, said accumulator outputting a value accumulated over said predetermined time interval, and a comparator for comparing said value produced from said accumulator with a threshold, said comparator issuing a control signal which is used for said selection of said IF bandpass filters.

2. A mobile receiver according to claim 1, further comprising a switch, based on an input from said comparator, for selectively inputting said incoming IF signal to said one of said IF bandpass filters.

3. A mobile receiver according to claim 2, further comprising a demodulator for receiving an output from said one of said group of IF bandpass filters and for demodulating said incoming IF signal having been filtered into first and second signals.

4. A mobile receiver according to claim 3, further comprising an analog-to-digital converter for converting said first and second signals output from said demodulator into first and second digital signals, respectively, said first and second digital signals being input to said signal contamination determiner.

5. A mobile receiver according to claim 4, further comprising a control signal extractor for extracting a control signal from said first and second digital signals.

6. A mobile receiver according to claim 1, further comprising a reference generator for storing said threshold and for providing an output to said comparator.

7. A mobile receiver according to claim 1, wherein, when said receiver is powered on, said accumulator outputs a value which exceeds said threshold, such that said comparator renders a predetermined one of said plurality of IF bandpass filters operable.

8. A mobile receiver according to claim 7, further comprising:

a duplexer for receiving an incoming RF signal;

a front end circuit for receiving and amplifying said incoming RF signal from said duplexer; and a mixer for converting said RF signal into said incoming IF signal, and for passing an intermediate frequency signal to one of said group of IF bandpass filters.

9. A method of adaptely controlling IF signal filtering at a mobile telephone receiver used in a cellular communications system, said method comprising steps of:

(a) allowing an incoming IF signal to be filtered out using one of a plurality of IF bandpass filters which are arranged in parallel and which have respectively different passbands with each other;

(b) determining a degree of signal contamination by examining a signal which has passed through said one of said IF bandpass filters including the steps of:

i) receiving a baseband signal outputted from a demodulator for calculating a receive signal deviation from a normal signal point, and successively producing a plurality of receive signal deviations. and ii) receiving and accumulating said plurality of receive signal deviations at a predetermined time interval, and outputting a value accumulated over said predetermined time imterval; and (c) adaptively changing selection of said IF bandpass filters according to said degree of signal contamination, wherein said step (c) includes comparing said value produced at step (ii) with a threshold, and issuing a control signal which is used for said selection of said IF bandpass filters.

10. A method according to claim 9, further comprising:

receiving, by said demodulator, an output from said one of said plurality of IF bandpass filters; and demodulating said incoming IF signal having been filtered, into first and second signals.

11. A method according to claim 10, wherein said step (b) comprises:

converting said first and second signals into first and second digital signals, respectively, wherein said first and second digital signals indicate said degree of signal contamination; and extracting a control signal from said first and second digital signals for supervisory control of said receiver.

12. A method according to claim 9, wherein said step (c) further comprises storing said threshold, wherein said step (e) comprises a step of, when said receiver is powered on, outputting a value which exceeds said threshold, such that a predetermined filter of said plurality of IF bandpass filters is rendered operable, wherein said step (a) comprises:

receiving an incoming RF signal;

amplifying said incoming RF signal; and converting said RF signal into said incoming IF signal, and passing said IF signal to said one of said plurality of IF bandpass filters.

\* \* \* \* \*